United States Patent
Li et al.

(10) Patent No.: US 7,932,636 B2
(45) Date of Patent: Apr. 26, 2011

(54) AUTOMATIC START-UP CIRCUIT AND UNINTERRUPTIBLE POWER SUPPLY APPARATUS HAVING SUCH AUTOMATIC START-UP CIRCUIT

(75) Inventors: Chia-Hsiang Li, Taoyuan Hsien (TW); Ping-Long Yang, Taoyuan Hsien (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 204 days.

(21) Appl. No.: 12/334,977

(22) Filed: Dec. 15, 2008

(65) Prior Publication Data
US 2010/0096928 A1   Apr. 22, 2010

(30) Foreign Application Priority Data
Oct. 16, 2008   (TW) .................................. 097139799

(51) Int. Cl.
H02J 7/00   (2006.01)
(52) U.S. Cl. ...................................................... 307/66
(58) Field of Classification Search ............. 307/64–66, 307/87, 46; 363/37, 58; 361/64, 87
See application file for complete search history.

(56) References Cited

U.S. PATENT DOCUMENTS

| | | | | |
|---|---|---|---|---|
| 3,766,403 A * | 10/1973 | Tsutsumi | ........................ | 307/66 |
| 5,300,874 A * | 4/1994 | Shimamoto et al. | .......... | 320/106 |
| 5,347,163 A * | 9/1994 | Yoshimura | ....................... | 307/66 |
| 6,392,316 B1 * | 5/2002 | Yoshioka et al. | ............... | 307/66 |
| 7,026,726 B2 * | 4/2006 | Shiojima | ........................ | 307/66 |
| 7,541,776 B2 * | 6/2009 | Tupman et al. | ............... | 320/134 |

\* cited by examiner

*Primary Examiner* — Albert W Paladini
(74) *Attorney, Agent, or Firm* — Kirton & McConkie; Evan R. Witt

(57) ABSTRACT

An automatic start-up circuit for use in an uninterruptible power supply apparatus is provided. The uninterruptible power supply apparatus includes an energy storage unit and a switching circuit. The automatic start-up circuit includes an operating status detecting circuit and a secondary switch driving circuit. The operating status detecting circuit is connected to an energy storage unit connecting node for detecting an operating status of the energy storage unit through the energy storage unit connecting node, and generating an start-up control signal according to the operating status of the energy storage unit. The secondary switch driving circuit is connected to the operating status detecting circuit, a control terminal of the switching circuit and a common terminal for determining whether the switching circuit is automatically driven to be conducted to start up the uninterruptible power supply apparatus according to the start-up control signal.

20 Claims, 3 Drawing Sheets

AUTOMATIC START-UP CIRCUIT AND UNINTERRUPTIBLE POWER SUPPLY APPARATUS HAVING SUCH AUTOMATIC START-UP CIRCUIT

FIELD OF THE INVENTION

The present invention relates to an start-up circuit and a power supply apparatus, and more particularly to an automatic start-up circuit and an uninterruptible power supply (UPS) apparatus.

BACKGROUND OF THE INVENTION

With increasing development of information industries and high-tech industries, most precise electronic instruments and facilities need highly reliable power to maintain normal operations. Generally, uninterruptible power supply (UPS) apparatuses are widely used to provide stable power to the loads that are connected with. In other words, UPS apparatuses become essential for supplying stable power.

In a case that the voltage of the utility power is suffered from a sudden variation or interruption, the power to the loads could be maintained at an applicable level by using the UPS apparatus. Generally, an activation switch is arranged on the casing of the UPS apparatus. When the activation switch is in an ON position, the UPS apparatus is started up to provide stable electric energy to the loads connected thereto. Whereas, when the activation switch is in an OFF position, the UPS apparatus is turned off and stops supplying electric energy to the loads. During operations of the UPS apparatus, if the activation switch is accidentally touched, the UPS apparatus is possibly turned off and thus the operations of the important loads will be ceased. Under this circumstance, undesirable system failure or data damage occurs.

On the other hand, if the battery of the UPS apparatus has a breakdown or is used over an extended period, the battery needs to be replaced with a new one in order to provide stable electric energy to the loads that are connected to the UPS apparatus. After the battery has been replaced, the activation switch should be switched to the ON position to assure whether the battery has been accurately replaced. This method, however, is not user-friendly.

Therefore, there is a need of providing an automatic start-up circuit and an uninterruptible power supply apparatus so as to obviate the drawbacks encountered from the prior art.

SUMMARY OF THE INVENTION

An object of the present invention provides an automatic start-up circuit for use in an uninterruptible power supply apparatus. The automatic start-up circuit of the present invention can detect the operating status of the energy storage unit and automatically drives a switching circuit so as to automatically start up an uninterruptible power supply apparatus. Since the uninterruptible power supply apparatus is automatically started up by the automatic start-up circuit, no additional activation switch is required and the drawbacks encountered from the prior art will be overcome.

In accordance with an aspect of the present invention, there is provided an automatic start-up circuit for use in an uninterruptible power supply apparatus. The uninterruptible power supply apparatus includes an energy storage unit and a switching circuit. The automatic start-up circuit includes an operating status detecting circuit and a secondary switch driving circuit. The operating status detecting circuit is connected to an energy storage unit connecting node for detecting an operating status of the energy storage unit indicative of whether the energy storage unit is installed in the uninterruptible power supply apparatus through the energy storage unit connecting node, and generating a start-up control signal according to the operating status of the energy storage unit. The secondary switch driving circuit is connected to the operating status detecting circuit, a control terminal of the switching circuit and a common terminal for determining whether the switching circuit is automatically driven to be conducted to start up the uninterruptible power supply apparatus according to the start-up control signal.

In accordance with another aspect of the present invention, there is provided an uninterruptible power supply apparatus. The uninterruptible power supply apparatus includes an AC-to-DC converting circuit, an energy storage unit, a charging circuit, a selection circuit, a switching circuit, an automatic start-up circuit, a control circuit and a main switch driving circuit. By the AC-to-DC converting circuit, an input AC voltage is converted into a first DC voltage. The energy storage unit is connected to an energy storage unit connecting node for storing electric energy. The charging circuit is interconnected between the AC-to-DC converting circuit and the energy storage unit for charging the energy storage unit. The selection circuit is connected to the AC-to-DC converting circuit, the energy storage unit connecting node and a load for selectively outputting the first DC voltage or an energy storage unit connecting node voltage to the load. The switching circuit is connected to the energy storage unit connecting node. The automatic start-up circuit is connected to the energy storage unit connecting node and a control terminal of the switching circuit for detecting an operating status of the energy storage unit indicative of whether the energy storage unit is installed in the uninterruptible power supply apparatus. The switching circuit is automatically driven to be conducted according to the operating status of the energy storage unit, thereby automatically starting up the uninterruptible power supply apparatus. The control circuit is connected to the switching circuit for controlling operations of the uninterruptible power supply apparatus and generating a first control signal. The main switch driving circuit is connected to the control terminal of the switching circuit and the control circuit for driving conduction of the switching circuit according to the first control signal.

The above contents of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
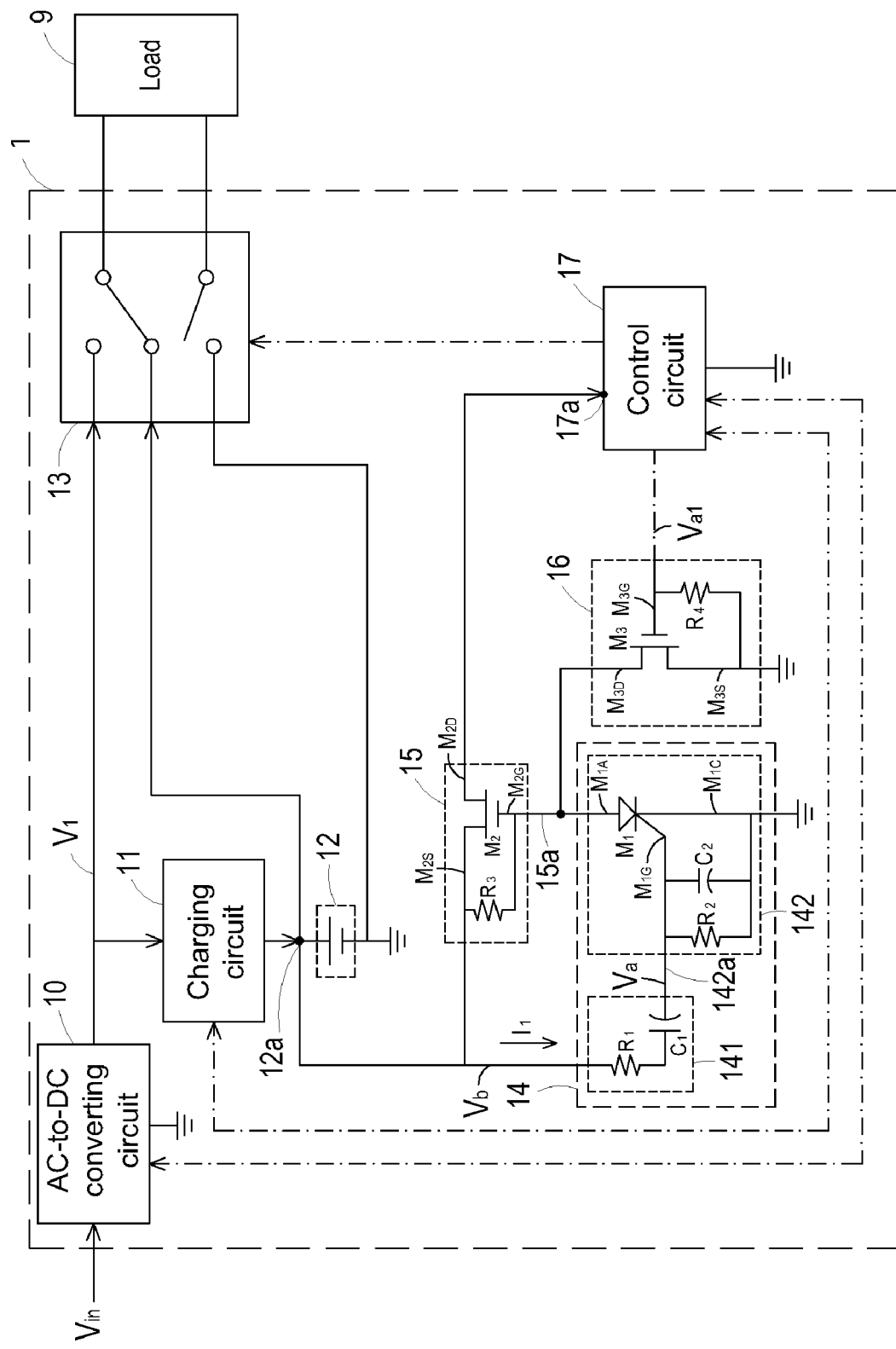
FIG. 1 is a schematic block functional diagram illustrating an uninterruptible power supply apparatus having an automatic start-up circuit according to a preferred embodiment of the present invention.

FIG. 1 is a schematic block functional diagram illustrating an uninterruptible power supply apparatus having an automatic start-up circuit according to a preferred embodiment of the present invention. As shown in FIG. 1, the uninterruptible power supply apparatus 1 principally comprises an AC-to-DC converting circuit 10, a charging circuit 11, an energy storage unit 12, a selection circuit 13, an automatic start-up circuit 14, a switching circuit 15, a main switch driving circuit 16 and a control circuit 17. The output terminal of the AC-to-DC converting circuit 10 is connected to the input terminal of the charging circuit 11 and a first input terminal of the selection circuit 13. By the AC-to-DC converting circuit 10, an input AC voltage Vin is converted into a first DC voltage $V_1$. The first DC voltage $V_1$ is transmitted to the charging circuit 11 and the load 9 through the selection circuit 13. The charging circuit 11 is connected to the output terminal of the an energy storage unit connecting node 12a and a second input terminal of the selection circuit 13 for converting the first DC voltage $V_1$ into a regulated DC voltage required for the energy storage unit 12. The energy storage unit 12 is connected with the output terminal of the charging circuit 11 through the energy storage unit connecting node 12a for storing electric energy. Consequently, if the voltage of the utility power is suffered from a sudden variation or interruption, the energy storage unit 12 can provide electric energy. The output terminal of the selection circuit 13 is connected to the load 9. Under control of the control circuit 17, the selection circuit 13 will selectively output the first DC voltage $V_1$ or the energy storage unit connecting node voltage $V_b$ to the load 9. In addition, the control circuit 17 can control the selection circuit 13 to interrupt provision of electric energy to the load 9. The automatic start-up circuit 14 is connected to the energy storage unit connecting node 12a and a control terminal 15a of the switching circuit 15. The automatic start-up circuit 14 can detect the operating status of the energy storage unit 12 through the energy storage unit connecting node 12a. According to the operating status of the energy storage unit 12, the automatic start-up circuit 14 will determine whether the switching circuit 15 is automatically driven to be conducted or not. If the switching circuit 15 is conducted, the uninterruptible power supply apparatus 1 is started up. The input terminal of the switching circuit 15 is connected to the energy storage unit connecting node 12a. The output terminal of the switching circuit 15 is connected to the power terminal 17a of the control circuit 17. The control terminal 15a of the switching circuit 15 is connected to both the main switch driving circuit 16 and the automatic start-up circuit 14. When the switching circuit 15 is driven to be conducted by the main switch driving circuit 16 and the automatic start-up circuit 14, the energy storage unit connecting node voltage $V_b$ is transmitted to the power terminal 17a of the control circuit 17 through the switching circuit 15 so as to provide electric energy to the control circuit 17. The control circuit 17 is connected to the AC-to-DC converting circuit 10, the charging circuit 11, the selection circuit 13, the switching circuit 15 and the main switch driving circuit 16 for controlling operations of the uninterruptible power supply apparatus 1.

In some embodiments, the AC-to-DC converting circuit 10 is a single-stage or multi-stage converting circuit. In a case that the AC-to-DC converting circuit 10 is a two-stage converting circuit, the first stage is an AC-to-DC converter for converting the input AC voltage Vin into a high DC voltage; and the second stage is a DC-to-DC converter for converting the high DC voltage into the first DC voltage $V_1$ required for the load 9.

The energy storage unit 12 includes one battery or multiple batteries that are connected to each other in series or in parallel. The battery or batteries are for example lithium ion batteries, lead acid batteries, nickel-metal hydride batteries, nickel-cadmium batteries, lithium-cobalt batteries, lithium iron phosphate batteries (C—LiFePO$_4$), Li-polymer batteries. In addition, the energy storage unit 12 is hot-pluggable or replaceable. In a case that the energy storage unit 12 has a breakdown, an extended use period or insufficient charge capacity, the energy storage unit 12 can be replaced with a new one.

In this embodiment, the selection circuit 13 is composed of several switching elements. In a case that some systematic messages occur, the control circuit 17 will adaptively control operations of the selection circuit 13. The systematic messages includes for example a sudden variation or interruption of the input AC voltage Vin, a breakdown of the AC-to-DC converting circuit 10, over-current of the load, or erroneous mounting or low charge capacity of the energy storage unit 12. For example, if the input AC voltage Vin operates within the normal range, the control circuit 17 will control the selection circuit 13 to output the first DC voltage $V_1$ to the load 9 through the selection circuit 13. If the input AC voltage Vin is suffered from a sudden variation or interruption, the control circuit 17 will control the selection circuit 13 to output the energy storage unit connecting node voltage $V_b$ to the load 9 through the selection circuit 13. In other words, the uninterruptible power supply apparatus 1 can continuously provide electric energy to the load 9 to maintain a normal operation of the load 9 even if the input AC voltage Vin is suffered from a sudden variation or interruption. If the load has an over-current, the control circuit 17 will control the selection circuit 13 to interrupt supplying electric energy to the load 9 so as to prevent damage of the uninterruptible power supply apparatus 1 or the load 9 from over-current.

An example of the control circuit 17 includes but is not limited to a micro controller or a digital signal processor. As shown in FIG. 1, the control circuit 17 can acquire the systematic messages of the uninterruptible power supply apparatus 1 and control operations of associated components through the dashed lines between the control circuit 17 and the associated components.

In this embodiment, the automatic start-up circuit 14 comprises an operating status detecting circuit 141 and a secondary switch driving circuit 142. The both terminals of the operating status detecting circuit 141 are connected to the energy storage unit 12 and the control terminal 142a of the secondary switch driving circuit 142, respectively. The operating status detecting circuit 141 can detect the operation status of the energy storage unit 12. The operation status of the energy storage unit 12 includes for example the connection or the disconnection between the energy storage unit 12 and the energy storage unit connecting node 12a. That is to say, by detecting the connection or disconnection between the status of the energy storage unit connecting node 12a which is a connecting node for the energy storage unit 12, the operating status detecting circuit 141 can detect the operation status of the energy storage unit 12 that may be an indication of whether the energy storage unit 12 is installed in the uninterruptible power supply apparatus 1 or not. According to the operation status of the energy storage unit 12, the operating status detecting circuit 141 issues a corresponding start-up control signal $V_a$ to the control terminal 142a of the secondary switch driving circuit 142. In response to the start-up control signal $V_a$, the secondary switch driving circuit 142 drives conduction of the switching circuit 15. Meanwhile, the energy storage unit connecting node voltage $V_b$ is transmitted to the power terminal 17a of the control circuit 17 through the switching circuit 15. After receiving the energy storage unit connecting node voltage $V_b$, the control circuit 17 is enabled to work the uninterruptible power supply apparatus 1. In some embodiment, the operating status detecting circuit 141 is implemented by a first capacitor $C_1$. In this embodiment, the operating status detecting circuit 141 includes a first resistor $R_1$ and a first capacitor $C_1$, which are connected in series, for detecting the operating status of the energy storage unit 12 and issuing the start-up control signal $V_a$ according to the operating status of the energy storage unit 12. In a case that the operating status of the energy storage unit 12 is changed, the first resistor $R_1$ can not only increase the duration of the start-up control signal $V_a$ but also limit the magnitude of the first current $I_1$ that flows into the automatic start-up circuit 14. Since the first capacitor $C_1$ is effective to isolate the DC current, the magnitude of the first current $I_1$ that flows into the automatic start-up circuit 14 is zero if the operating status of the energy storage unit 12 is fixed. That is, if the operating status of the energy storage unit 12 is kept unchanged, the power consumed by the automatic start-up circuit 14 is zero. In some embodiments, the secondary switch driving circuit 142 is implemented by a first switching element $M_1$. The anode $M_{1A}$ of the first switching element $M_1$ is connected to the control terminal 15a of the switching circuit 15. The cathode $M_{1C}$ of the first switching element $M_1$ is connected to a common terminal. An example of the first switching element $M_1$ includes but is not limited to a silicon-controlled rectifier (SCR), a bipolar junction transistor (BJT) or a metal oxide semiconductor field effect transistor (MOSFET). In this embodiment, the secondary switch driving circuit 142 further comprises a second resistor $R_2$ and a second capacitor $C_2$, which are connected in parallel to the control terminal $M_{1G}$ and the cathode $M_{1C}$ of the first switching element $M_1$, for eliminating undesirable noise. Moreover, the second resistor $R_2$ and the first resistor $R_1$ collectively define a resistor-dividing circuit. Since the start-up control signal $V_a$ is subject to voltage division by the second resistor $R_2$ and the first resistor $R_1$, the magnitude of the first current $I_1$ that flows into the automatic start-up circuit 14 is limited, the power energy consumed during the automatic start-up circuit 14 is initiated is decreased, and the magnitude of the current flowing from the operating status detecting circuit 141 to the first switching element $M_1$ is also limited.

In some embodiments, the switching circuit 15 includes a second switching element $M_2$. The source terminal $M_{2S}$ of the second switching element $M_2$ is connected to the anode of the energy storage unit 12. The drain terminal $M_{2D}$ of the second switching element $M_2$ is connected to the power terminal 17a of the control circuit 17. The control terminal $M_{2G}$ of the second switching element $M_2$ is connected to the automatic start-up circuit 14 and the main switch driving circuit 16. The automatic start-up circuit 14 and the main switch driving circuit 16 can timely drive conduction of the second switching element $M_2$. When the automatic start-up circuit 14 or the main switch driving circuit 16 drives conduction of the second switching element $M_2$, the energy storage unit connecting node voltage $V_b$ will be transmitted to the power terminal 17a of the control circuit 17 through the second switching element $M_2$ so as to provide electric energy to the control circuit 17 to enable the control circuit 17. An example of the second switching element $M_2$ includes but is not limited to a silicon-controlled rectifier (SCR), a bipolar junction transistor (BJT) or a metal oxide semiconductor field effect transistor (MOSFET). In this embodiment, the switching circuit 15 further comprises a third resistor $R_3$, which is connected in parallel to the source terminal $M_{2S}$ and the control terminal $M_{2G}$ of the second switching element $M_2$, for eliminating undesirable noise and increasing the stability of the switching circuit 15.

In some embodiment, the main switch driving circuit 16 includes a third switching element $M_3$. The drain terminal $M_{3D}$ of the third switching element $M_3$ is connected to the control terminal 15a of the switching circuit 15. The source terminal $M_{3S}$ of the third switching element $M_3$ is connected to the common terminal. The control terminal $M_{3G}$ of the third switching element $M_3$ is connected to the control circuit 17. The control circuit 17 issue a first control signal $V_{a1}$ to the control terminal $M_{3G}$ of the third switching element $M_3$ so as to control on/off statuses of the third switching element $M_3$. An example of the third switching element $M_3$ includes but is not limited to a silicon-controlled rectifier (SCR), a bipolar junction transistor (BJT) or a metal oxide semiconductor field effect transistor (MOSFET). In this embodiment, the main switch driving circuit 16 further comprises a fourth resistor $R_4$, which is connected in parallel to the source terminal $M_{3S}$ and the control terminal $M_{3G}$ of the third switching element $M_3$, for eliminating undesirable noise and increasing the stability of the main switch driving circuit 16.

Figure 2:
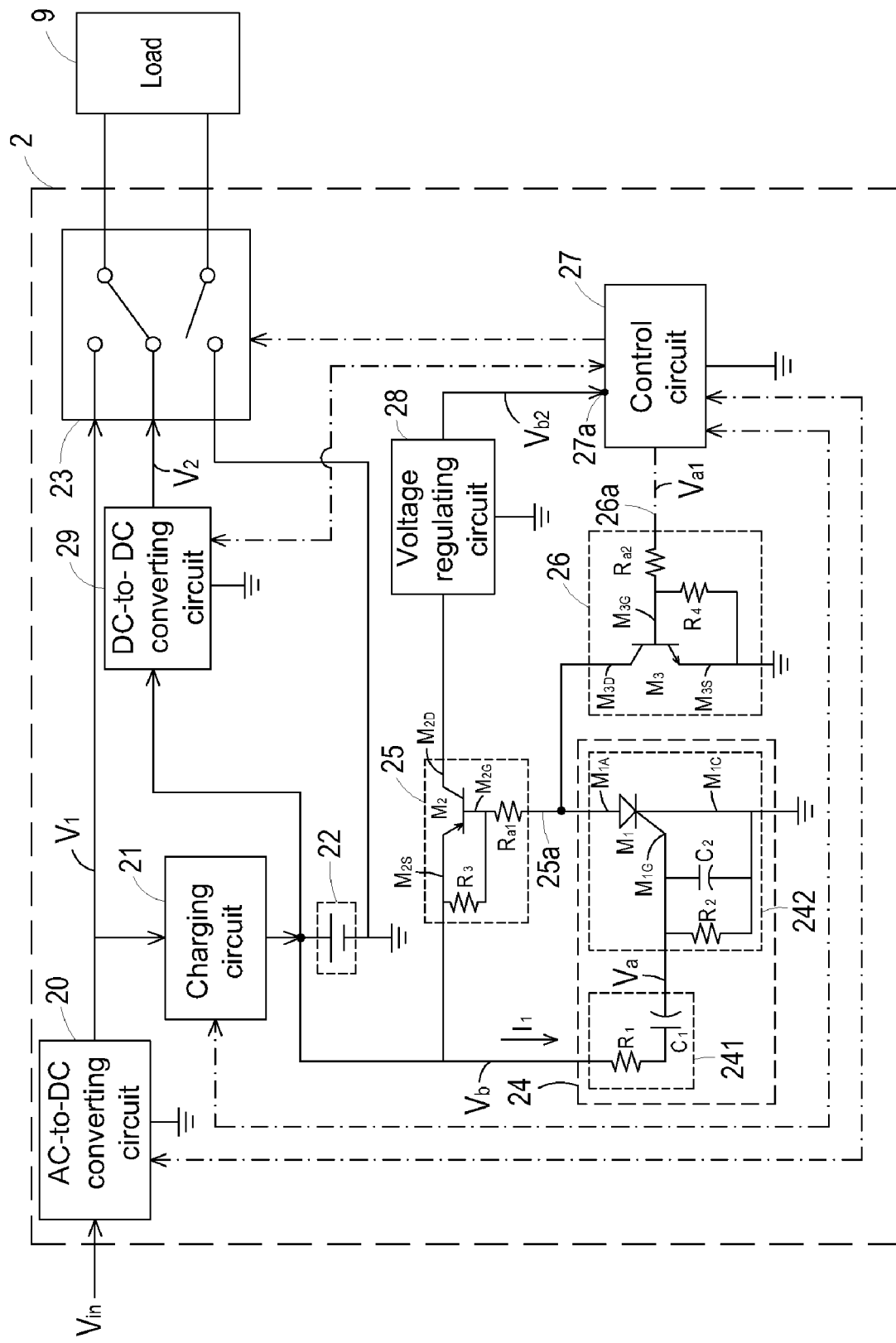
FIG. 2 is a schematic block functional diagram illustrating an uninterruptible power supply apparatus having an automatic start-up circuit according to another preferred embodiment of the present invention.

FIG. 2 is a schematic block functional diagram illustrating an uninterruptible power supply apparatus having an automatic start-up circuit according to another preferred embodiment of the present invention. As shown in FIG. 2, the uninterruptible power supply apparatus 2 principally comprises an AC-to-DC converting circuit 20, a charging circuit 21, an energy storage unit 22, a selection circuit 23, an automatic start-up circuit 24, a switching circuit 25, a main switch driving circuit 26, a control circuit 27, a voltage regulating circuit 28 and a DC-to-DC converting circuit 29. The operations of the AC-to-DC converting circuit 20, the charging circuit 21, the energy storage unit 22, the selection circuit 23, the operating status detecting circuit 241 and the secondary switch driving circuit 242 of the automatic start-up circuit 24 and the control circuit 27 included in FIG. 2 are identical to those shown in FIG. 1, and are not redundantly described herein. In comparison with the uninterruptible power supply apparatus 1 of FIG. 1, the switching circuit 25 and the main switch driving circuit 26 are distinguished and the uninterruptible power supply apparatus 2 of this embodiment further comprises the voltage regulating circuit 28 and the DC-to-DC converting circuit 29.

In this embodiment, the second switching element $M_2$ of the switching circuit 25 and the third switching element $M_3$ of the main switch driving circuit 26 are bipolar junction transistors (BJTs). The switching circuit 25 and the main switch driving circuit 26 further comprises a first current-limiting resistor $R_{a1}$ and a second current-limiting resistor $R_{a2}$, respectively. Since the emitter and the collector of a bipolar junction transistor are respectively similar to the source terminal and the drain terminal of the metal oxide semiconductor field effect transistor (MOSFET), the designations of the source terminals and the drain terminals of the MOSFETs (i.e. the second switching element $M_2$ of the switching circuit 25 and the third switching element $M_3$ of the main switch driving circuit 26) are continuously used in this drawing to respectively denote the emitters and the collectors of the bipolar junction transistors.

In this embodiment, the first current-limiting resistor $R_{a1}$ is connected in series to the control terminal $M_{2G}$ of the second switching element $M_2$ and the anode MIA of the first switching element $M_1$ for limiting the magnitude of the current flowing into the anode $M_{1A}$ of the first switching element $M_1$. The second current-limiting resistor $R_{a2}$ is connected in series to the control terminal $26a$ of the main switch driving circuit 26 and the control terminal $M_{3G}$ of the third switching element $M_3$ for limiting the magnitude of the current flowing into the control terminal $M_{3G}$ of the third switching element $M_3$.

In this embodiment, the energy storage unit connecting node voltage $V_b$ fails to be directly used by the control circuit 27. Consequently, the voltage regulating circuit 28 of the uninterruptible power supply apparatus 2 is interconnected between the switching circuit 25 and the power terminal $27a$ of the control circuit 27 for adjusting the connecting node voltage $V_b$ into an adjusted voltage $V_{b2}$ required for the control circuit 27.

In this embodiment, the magnitude of the first DC voltage $V_1$ that is transmitted to the load 9 is not equal to the magnitude of the energy storage unit connecting node voltage $V_b$. Under this circumstance, the energy storage unit connecting node voltage $V_b$ is converted by the DC-to-DC converting circuit 29 into a second DC voltage $V_2$ that has a magnitude equal to the first DC voltage $V_1$. In this embodiment, the DC-to-DC converting circuit 29 is interconnected between the anode of the energy storage unit 22 and the selection circuit 23 for converting the energy storage unit connecting node voltage $V_b$ into the second DC voltage $V_2$.

Figure 3:
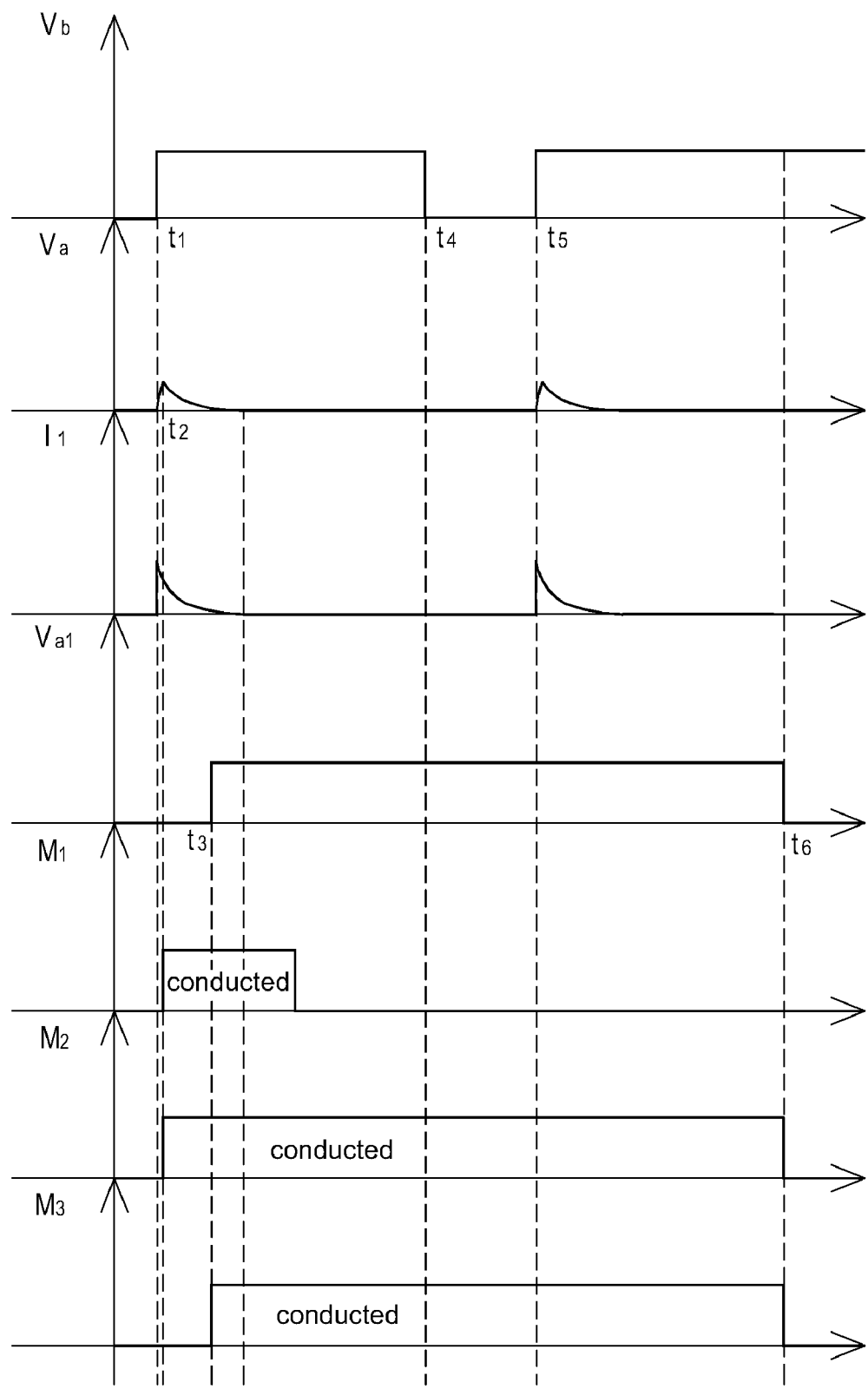
FIG. 3 is a timing waveform diagram schematically illustrating the corresponding voltage signals and current signals processed in the uninterruptible power supply apparatus of the present invention.

FIG. 3 is a timing waveform diagram schematically illustrating the corresponding voltage signals and current signals processed in the uninterruptible power supply apparatus of the present invention. Please refer to FIGS. 1, 2 and 3. As shown in FIG. 3, before the time spot $t_1$, the uninterruptible power supply apparatus 1 or 2 is in an OFF status and the energy storage unit 12 or 22 has not been installed in the power supply apparatus 1 or 2. Under this circumstance, the switching circuit 15 or 25 is shut off and thus no electrical power is transmitted to the power terminal $17a$ or $27a$ of the control circuit 17 or 27. The operation of the control circuit 17 or 27 is suspended. Likewise, the operation of the charging circuit 11 or 21 is also suspended such that the energy storage unit connecting node voltage $V_b$ is zero.

At the time spot $t_1$ when the energy storage unit 12 or 22 is installed in the uninterruptible power supply apparatus 1 or 2, the energy storage unit connecting node voltage $V_b$ is abruptly changed.

At the time spot $t_2$, the operating status detecting circuit 141 or 241 detects the operation status of the energy storage unit 12 or 22 and generates a corresponding start-up control signal $V_a$. In response to the start-up control signal $V_a$, the first switching element $M_1$ is conducted. At the same time, the secondary switch driving circuit 142 or 242 drives conduction of the switching circuit 15 or 25 such that the second switching element $M_2$ is conducted. Through the second switching element $M_2$, the energy storage unit connecting node voltage $V_b$ is transmitted to the power terminal $17a$ or $27a$ of the control circuit 17 or 27. Meanwhile, the control circuit 17 or 27 is enabled to start up the uninterruptible power supply apparatus 1 or 2.

During operation of the control circuit 17 or 27, the control circuit 17 or 27 generates the first control signal $V_{a1}$. In response to the first control signal $V_{a1}$, the third switching element $M_3$ is conducted. At the same time, the main switch driving circuit 16 or 26 drives conduction of the switching circuit 15 or 25. At the time spot $t_3$ (after the time spot $t_2$), the first control signal $V_{a1}$ is switched from a low voltage-level state (i.e. a disabling state) to a high voltage-level state (i.e. an enabling state). That is, the time difference ($t_3-t_2$) between the time spot $t_2$ and the time spot $t_3$ is defined as a response time. The response time indicates the time period for the control circuit 17 or 27 to generate the first control signal $V_{a1}$ after the first switching element $M_1$ has been conducted.

After the time spot $t_3$, the uninterruptible power supply apparatus 1 or 2 has been started up and the energy storage unit connecting node voltage $V_b$ is kept unchanged. Since the first capacitor $C_1$ is effective to isolate the DC current, the magnitude of the first current $I_1$ that flows into the automatic start-up circuit 14 or 24 is zero after the uninterruptible power supply apparatus 1 or 2 has been started up. Under this circumstance, no power is consumed by the automatic start-up circuit 14 or 24.

After the uninterruptible power supply apparatus 1 or 2 has been started up, even if the energy storage unit 12 or 22 is removed at the time spot $t_4$, the uninterruptible power supply apparatus 1 or 2 still provides electric energy to the load 9. Since the uninterruptible power supply apparatus 1 or 2 has been started up, after the energy storage unit 12 or 22 is replaced with a new one at the time spot $t_5$, the uninterruptible power supply apparatus 1 or 2 are still in the operating status.

Moreover, after the energy storage unit 12 or 22 has been installed, the first switching element $M_1$ will not be continuously conducted. That is, after the uninterruptible power supply apparatus 1 or 2 has been started up, the first switching element $M_1$ will be shut off, so that the secondary switch driving circuit 142 or 242 stops driving conduction of the switching circuit 15 or 25. Since the main switch driving circuit 16 or 26 drives conduction of the switching circuit 15 or 25 after the uninterruptible power supply apparatus 1 or 2 has been started up, the switching circuit 15 or 25 is continuously conducted. In some embodiments, the switching circuit 15 or 25 is shut off under control of the control circuit 17 or 27 such that no electric energy is transmitted to the control circuit 17 or 27. Consequently, the control circuit 17 or 27 is disabled and the operation of the uninterruptible power supply apparatus 1 or 2 is suspended.

In this embodiment, if the load is suffered over-current at the time spot $t_6$, the first control signal $V_{a1}$ is switched from the high voltage-level state (i.e. an enabling state) to the low voltage-level state (i.e. a disabling state) by the control circuit 17 or 27. As a result, the main switch driving circuit 16 or 26 stops driving conduction of the switching circuit 15 or 25 and the operation of the uninterruptible power supply apparatus 1 or 2 is suspended.

From the above description, the automatic start-up circuit of the present invention can detect the operating status of the energy storage unit and automatically drives a switching circuit so as to automatically start up an uninterruptible power supply apparatus having such an automatic start-up circuit. The operation status of the energy storage unit includes for example the connection or the disconnection between the energy storage unit and the energy storage unit connecting node. That is to say, the operation status of the energy storage unit may be an indication of whether the energy storage unit is installed in the uninterruptible power supply apparatus or not. If the operating status of the energy storage unit is kept unchanged, no power is consumed by the automatic start-up circuit. As a result, the overall performance of the uninterruptible power supply apparatus is enhanced. Moreover, no power is consumed by the automatic start-up circuit when the operating status of the energy storage unit is kept unchanged, regardless whether the uninterruptible power supply apparatus is in the backup power supply mode or other modes. In other words, the electric energy stored in the energy storage unit is not reduced when the operating status of the energy storage unit is kept unchanged. Under this circumstance, if the voltage of the utility power is suffered from a sudden variation or interruption, the duration and the charge capacity of the energy storage unit is sufficient to provide stable electric energy to the loads that are connected to the uninterruptible power supply apparatus.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An automatic start-up circuit for use in an uninterruptible power supply apparatus, said uninterruptible power supply apparatus comprising an energy storage unit and a switching circuit, said automatic start-up circuit comprising:
   an operating status detecting circuit connected to an energy storage unit connecting node for detecting an operating status of said energy storage unit indicative of whether the energy storage unit is installed in the uninterruptible power supply apparatus or not through said energy storage unit connecting node, and generating an start-up control signal according to said operating status of said energy storage unit; and
   a secondary switch driving circuit connected to said operating status detecting circuit, a control terminal of said switching circuit and a common terminal for determining whether said switching circuit is to be driven to be conducted when said start-up signal indicates that the energy storage unit is installed in the uninterruptible power supply apparatus, thereby automatically starting up said uninterruptible power supply apparatus.

2. The automatic start-up circuit according to claim 1 wherein said operating status detecting circuit comprises a first capacitor, which has an terminal connected to said energy storage unit connecting node and the other terminal connected to a control terminal of said secondary switch driving circuit.

3. The automatic start-up circuit according to claim 2 wherein said operating status detecting circuit further comprises a first resistor, and said first resistor and said first capacitor are connected in series with each other for increasing the duration of said start-up control signal.

4. The automatic start-up circuit according to claim 3 wherein said secondary switch driving circuit comprises a first switching element, which has an anode connected to said control terminal of said switching circuit, a cathode connected to said common terminal and a control terminal connected to said control terminal of said secondary switch driving circuit.

5. The automatic start-up circuit according to claim 4 wherein said secondary switch driving circuit further comprises a second resistor and a second capacitor, which are connected in parallel to said control terminal and said cathode of said first switching element, for eliminating noise and limiting the magnitude of a first current flowing into said automatic start-up circuit.

6. The automatic start-up circuit according to claim 5 wherein the magnitude of said first current flowing into said automatic start-up circuit is substantially zero after said uninterruptible power supply apparatus is started up.

7. The automatic start-up circuit according to claim 1 wherein said secondary switch driving circuit stops driving conduction of said switching circuit after said uninterruptible power supply apparatus is started up.

8. The automatic start-up circuit according to claim 1 wherein said uninterruptible power supply apparatus further comprises:
   a control circuit connected to said switching circuit for controlling operations of said uninterruptible power supply apparatus and generating a first control signal, wherein an electric energy is supplied to said control circuit through said switching circuit; and
   a main switch driving circuit connected to said control terminal of said switching circuit and said common terminal for driving conduction of said switching circuit according to said first control signal.

9. The automatic start-up circuit according to claim 8 wherein said uninterruptible power supply apparatus further comprises a voltage regulating circuit interconnected between said switching circuit and said control circuit for adjusting an output voltage of said switching circuit into an adjusted voltage that is required for said control circuit.

10. An uninterruptible power supply apparatus comprising:
    an AC-to-DC converting circuit for converting an input AC voltage into a first DC voltage;
    an energy storage unit connected to an energy storage unit connecting node for storing electric energy;
    a charging circuit interconnected between said AC-to-DC converting circuit and said energy storage unit for charging said energy storage unit;
    a selection circuit connected to said AC-to-DC converting circuit, said energy storage unit connecting node and a load for selectively outputting said first DC voltage or an energy storage unit connecting node voltage to said load;
    a switching circuit connected to said energy storage unit connecting node;
    an automatic start-up circuit connected to said energy storage unit connecting node and a control terminal of said switching circuit for detecting an operating status of said energy storage unit indicative of whether the energy storage unit is installed in the uninterruptible power supply apparatus, wherein said switching circuit is driven to be conducted when said start-up signal indicates that the energy storage unit is installed in the uninterruptible power supply apparatus, thereby automatically starting up said uninterruptible power supply apparatus;
    a control circuit connected to said switching circuit for controlling operations of said uninterruptible power supply apparatus and generating a first control signal; and
    a main switch driving circuit connected to said control terminal of said switching circuit and said control circuit for driving conduction of said switching circuit according to said first control signal.

11. The uninterruptible power supply apparatus according to claim 10 wherein said automatic start-up circuit further comprises:
    an operating status detecting circuit connected to said energy storage unit connecting node for detecting said operating status of said energy storage unit through said energy storage unit connecting node, and generating an start-up control signal according to said operating status of said energy storage unit; and
    a secondary switch driving circuit connected to said operating status detecting circuit, said control terminal of said switching circuit and a common terminal for determining whether said switching circuit is automatically driven to be conducted to start up said uninterruptible power supply apparatus according to said start-up control signal.

12. The uninterruptible power supply apparatus according to claim 11 wherein said operating status detecting circuit comprises a first capacitor, which has an terminal connected to said energy storage unit connecting node and the other terminal connected to a control terminal of said secondary switch driving circuit.

13. The uninterruptible power supply apparatus to claim 12 wherein said operating status detecting circuit further comprises a first resistor, and said first resistor and said first capacitor are connected in series with each other for increasing the duration of said start-up control signal.

14. The uninterruptible power supply apparatus according to claim 13 wherein said secondary switch driving circuit comprises a first switching element, which has an anode connected to said control terminal of said switching circuit, a cathode connected to said common terminal and a control terminal connected to said control terminal of said secondary switch driving circuit.

15. The uninterruptible power supply apparatus according to claim 14 wherein said secondary switch driving circuit further comprises a second resistor and a second capacitor, which are connected in parallel to said control terminal and said cathode of said first switching element, for eliminating noise and limiting the magnitude of a first current flowing into said automatic start-up circuit.

16. The uninterruptible power supply apparatus according to claim 15 wherein the magnitude of said first current flowing into said automatic start-up circuit is substantially zero after said uninterruptible power supply apparatus is started up.

17. The uninterruptible power supply apparatus according to claim 11 wherein said secondary switch driving circuit stops driving conduction of said switching circuit after said uninterruptible power supply apparatus is started up, and an electric energy is supplied to said control circuit through said switching circuit.

18. The uninterruptible power supply apparatus according to claim 10 further comprising a voltage regulating circuit interconnected between said switching circuit and said control circuit for adjusting an output voltage of said switching circuit into an adjusted voltage that is required for said control circuit.

19. The uninterruptible power supply apparatus according to claim 10 further comprising a DC-to-DC converting circuit interconnected between said energy storage unit connecting node and said selection circuit for converting said energy storage unit connecting node voltage into a second DC voltage.

20. The uninterruptible power supply apparatus according to claim 19 wherein said second DC voltage is substantially equal to said first DC voltage.

* * * * *